United States Patent [19]

Wilkinson et al.

[11] Patent Number: 4,616,356

[45] Date of Patent: Oct. 7, 1986

[54] APERTURE COMPENSATION SIGNAL PROCESSOR FOR OPTICAL RECORDING

[75] Inventors: Richard L. Wilkinson, El Toro; Wayne R. Dakin, Huntington Beach, both of Calif.

[73] Assignee: Optical Disc Corporation, Cerritos, Calif.

[21] Appl. No.: 586,675

[22] Filed: Mar. 6, 1984

[51] Int. Cl.$^4$ .............................................. G11B 7/00
[52] U.S. Cl. .................................... 369/116; 369/109; 369/111; 369/124
[58] Field of Search .................. 369/48, 49, 111, 112, 369/116, 117, 124, 174, 175, 109; 358/342; 346/76 L

[56] References Cited

U.S. PATENT DOCUMENTS

| | | | |
|---|---|---|---|
| 4,142,210 | 2/1979 | Otobe et al. | 369/111 |
| 4,152,726 | 5/1979 | Kojima et al. | 369/116 |
| 4,225,873 | 9/1980 | Winslow | 346/76 L |
| 4,243,849 | 1/1981 | Goshima et al. | 369/124 |
| 4,370,679 | 1/1983 | Ceshkovsky et al. | 369/124 |
| 4,419,750 | 12/1983 | Howe | 369/111 |
| 4,425,637 | 1/1984 | Tanaka et al. | 369/124 |
| 4,426,693 | 1/1984 | Satoh et al. | 369/45 |

FOREIGN PATENT DOCUMENTS 0028111 5/1981 European Pat. Off. .

OTHER PUBLICATIONS

Firester et al., "Optical Recording Techniques for the RCA Video Disc" from *RCA Review*, Sep. 1978, pp. 427–471.

*Primary Examiner*—Donald McElheny, Jr.
*Attorney, Agent, or Firm*—Steven P. Brown

[57] ABSTRACT

A signal processor and method for frequency compensating the drive signal for an optical modulator in an optical recording apparatus to make the exposure level modulation amplitude on the medium independent of the spatial frequency of the information being recorded. The processor compensates for exposure level modulation roll off at high spatial frequencies due to the finite size of the recording spot by increasing the amplitude of the modulator drive signal at high frequencies. The compensation is preferably the inverse of the modulation transfer function of the recording objective lens.

23 Claims, 10 Drawing Figures

APERTURE COMPENSATION SIGNAL PROCESSOR FOR OPTICAL RECORDING

BACKGROUND OF THE INVENTION

The present invention relates to the field of signal processing systems. More particularly, the present invention relates to the field of signal processing systems for use in optical information recording systems. Specifically, the present invention relates to a signal processing system for overcoming frequency dependent modulation degradation as a result of limited resolution recording optics and other elements of the recording system.

A great many systems are known for optically recording information on light responsive media. Digital information as well as analog information can be recorded on a variety of media, including photoresists, photochromic materials, and thermally responsive materials in the form of discs, drums, and tape.

Virtually all of these known systems employ some form of pulse code modulation (PCM) or frequency modulation (FM) due to the nonlinearities of known optical recording media. Additionally, virtually all of these known systems employ an optical system including an objective lens for focussing the writing beam of light to a small spot on the light sensitive surface of the medium. In order to maximize the information density of the recorded material, it is necessary to focus the writing beam to the smallest possible spot size. Due to defraction effects, a focussed beam of coherent radiation forms a central bright spot surrounded by concentric spaced rings of light known as an Airy disc and having an approximately Gaussian power distribution. The diameter of the central spot of light is defined by the wavelength of the recording light and the numerical aperture (NA) of the objective lens.

Most optical recording media exhibit a threshold effect, meaning that a level of writing beam power density exists above which the medium will be altered, and below which the medium will not be altered. Since the power density of the focussed writing beam varies as a function of the distance from the center of the central spot, it is possible to form altered areas on a medium which are smaller than the diameter of the central spot of the focussed light. In order to obtain an altered area of a specific size, the prior art has taught that it is merely necessary to adjust the peak intensity of the modulated beam such that the power density of the focussed spot at the specified diameter is equal to the threshold level of the recording medium. Experimental results indicate that this technique works extremely well when there is no relative movement between the writing spot and the medium and no thermal conductivity effects diffusing the energy absorbed by the medium. In all practical systems, however, relative movement between the medium and the recording spot is necessary. This relative movement greatly complicates the calculation of the amount of energy absorbed by a particular area of the medium.

All light responsive media exhibit a tendency to integrate the amount of energy received over a period of time, so that the threshold level of the material does not define a specific instantaneous power density at which the material is altered, but rather defines an energy density which is the result of an integration of the received power over the time during which the power is received. In other words, the threshold level for the materials is actually an exposure level. Exposure level is defined as the radiant flux per unit area integrated over the exposure time. The radiant flux irradiating a particular point on the medium at a particular time is a function of the position of the point within the focussed spot, as well as the instantaneous modulation level of the writing beam. Specifically, the exposure level at a particular point on the medium is equal to the convolution integral of the instantaneous power of the modulated writing beam as a function of time and the power density distribution function defined by the path and speed of the particular point of the medium through the focussed spot, evaluated over the exposure time. Since the power distribution of the focussed spot varies in two dimensions, the exposure level over the medium defines a three dimensional graph. The intersection points of this graph with a planar "slice" through the graph at the altitude corresponding to the threshold level of the medium maps the boundries of the altered areas on the medium.

An important concept in determining the effect of the finite size of the recording spot is the concept of the spatial frequency of the information on the moving recording medium. The spatial frequency is the number of cycles of modulation of the writing beam seen by a unit length of the medium in the direction of movement of the medium. Naturally, higher frequencies of modulation and slower relative speeds between the spot and the medium increase the spatial frequency of the information. Since the area of the writing spot is fixed by the wavelength of the writing beam and the numerical aperture of the lens, the effects of the finite spot size increase with increasing spatial frequency.

The modulation transfer function (MTF) is a curve used to describe the ratio of object contrast to image contrast for a given optical system at various spatial frequencies of object information. The MTF at a particular spatial frequency is dependent solely upon the wavelength of the projected light and the numerical aperture of the optical system. The MTF is normally used in reference to imaging systems and can be measured for a particular system by using an object having a known spatial frequency, such as parallel lines which vary in intensity in a sinusoidal fashion of known spatial frequency and modulation level. An image of this object is formed using the optical system. The MTF is then the ratio between the modulation level of the object and the modulation level measured at the image plane of the optical system.

The prior art has recognized that the MTF of a lens system used for optically reading information from a storage member defines the recovered modulation amplitude in terms of the spatial frequency of the recorded information. When the information was recorded in such a manner that its spatial frequency varied, such as when the information was recorded on a disc turning at a constant angular velocity, the prior art recognized that the modulation level of the recovered information would vary with the change in spatial frequency of the information resulting from the change in speed of the medium relative to the reading beam. A closed loop system for correcting the modulation level of an FM signal recovered from a video disc turning at constant angular velocity is disclosed in U.S. Pat. No. 4,370,679, entitled "Gain Correction System for Video Disc Player Apparatus". The system disclosed in this patent varies the gain of the higher frequency components of the recovered signal by an amount proportional to the difference between the amplitude of a portion of the recovered signal and a reference amplitude. Other prior art systems are known which vary the gain versus frequency characteristics of the playback electronics as a function of the radial position of the reading beam on an information carrying disc.

It has been hithertofore unrecognized that the size of the recording spot as defined by the numerical aperture of the recording objective lens and the wavelength of the recording light not only affects the size of the information which can be written on the disc, but also causes a spatial frequency dependence in the modulation amplitude of the exposure level of the medium. The resulting decrease in modulation amplitude at higher spatial frequencies results in decreased operating level tolerances at higher spatial frequencies which can result in dropouts of high frequency information or at relatively slow relative speeds between the writing spot and the medium, even though the unfocussed beam is properly modulated and substantially perfect recording occurs at slightly lower spatial frequencies.

Accordingly, a need exists for an information processing system capable of compensating for the spatial frequency dependence of the exposure level modulation amplitude in optical recording devices.

SUMMARY OF THE INVENTION

It is an object of the present invention to provide a signal processing system capable of compensating for this problem.

It is a further object of the present invention to provide a recording apparatus employing such a signal processing system such that the modulation amplitude of the exposure level of the medium is substantially independent of the spatial frequency of the information.

It is a still further object of the present invention to provide a signal processing system with a gain versus frequency function which is substantially the inverse of the function describing the spatial frequency dependence of the optical system of an information recording apparatus.

The present invention achieves these objects by providing a signal processing system which has a frequency response or gain versus frequency function which is substantially the inverse of the modulation transfer function of the optical system of the recording apparatus over the range of frequencies recorded. The system of the present invention thereby increases the gain of the higher frequency components of the information signal such that the amplitude of the modulation of the light writing the higher frequency components of the information is higher than the amplitude of modulation of the light writing the lower frequency components of the information. Since the recording optics focus this modulated light to a spot of finite size, and since each point on the recording medium scanned by the relatively moving spot integrates the instantaneous amounts of radiant flux received over the exposure time, the amplitude of modulation of the exposure level of the portions of the medium receiving relatively high spatial frequency information is decreased relative to the amplitude of modulation of the exposure level of the portions of the medium receiving relatively low frequency information. Accordingly, the amplitude of modulation of the exposure level is substantially independent of the frequency of the information.

Since the relationship between the frequency of the information and the spatial frequency of the recorded information is dependent upon the speed of relative motion between the focussed recording spot and the recording medium, it is also advantageous to vary the gain versus frequency function of the signal processing system with any variations in this relative speed. Therefore, in accordance with a further aspect of the present invention, the frequency response of the system is varied with the speed of the medium. Preferably, the slope of the gain versus frequency function of the system is varied as a function of the relative speed between the focussed recording spot and the medium such that the gain versus spatial frequency of the system remains the inverse of the modulation transfer function of the optical system of the recording apparatus throughout the entire range of relative speeds encountered during the operation of the apparatus.

It should be noted that the signal processing described above is not intended as a substitute for the writing beam intensity level stabilization and adjustment normally performed in the process of optically recording information. The need for those additional steps in order to achieve proper duty cycle of the recorded information and to minimize second harmonic distortion of the recorded information is discussed in the prior art and in particular in U.S. Pat. No. 4,225,873, entitled "Recording and Playback System". A complete recording system preferably stabilizes the average intensity of the modulated beam relative to the threshold level of the recording medium in order to minimize the distortion of the recorded signal. Additionally, a complete system preferably varies the average writing beam power in direct proportion to the relative speed between the focussed writing spot and the recording medium due to the increasing volume of material to be altered with increasing speed.

In order to prevent interference between the various signal processing systems of a recording apparatus, it is preferable to design the frequency dependent system of the present invention such that it does not affect the average intensity of the modulated writing beam. For systems which record information in an FM format as frequency variations relative to a carrier frequency, it is therefore preferable to design the signal processing system such that the gain of the system at the carrier frequency remains unchanged. Additionally, where lower frequency information is summed with high frequency information, such as the low frequency audio carriers summed with the high frequency video carrier recorded on a video disc, it is preferable for the frequency dependent signal processing system of the present invention to affect the modulation amplitude of the high frequency information only. This is accomplished by summing the low frequency carriers with the high frequency carrier after it has passed through the frequency dependent signal processing system.

To prevent any distortion caused by the signal processing system, it is preferable to form the system using a linear phase filter. A cosine equalizer is a presently preferred device due to its linear phase characteristics and the possibility of adjusting the slope of the gain versus frequency function of the equalizer while maintaining the gain of the equalizer at a central frequency constant.

Further features and advantages of the present invention will be apparent from the following description of a particular embodiment of the invention.

DESCRIPTION OF THE PREFERRED EMBODIMENT

Figure 1:
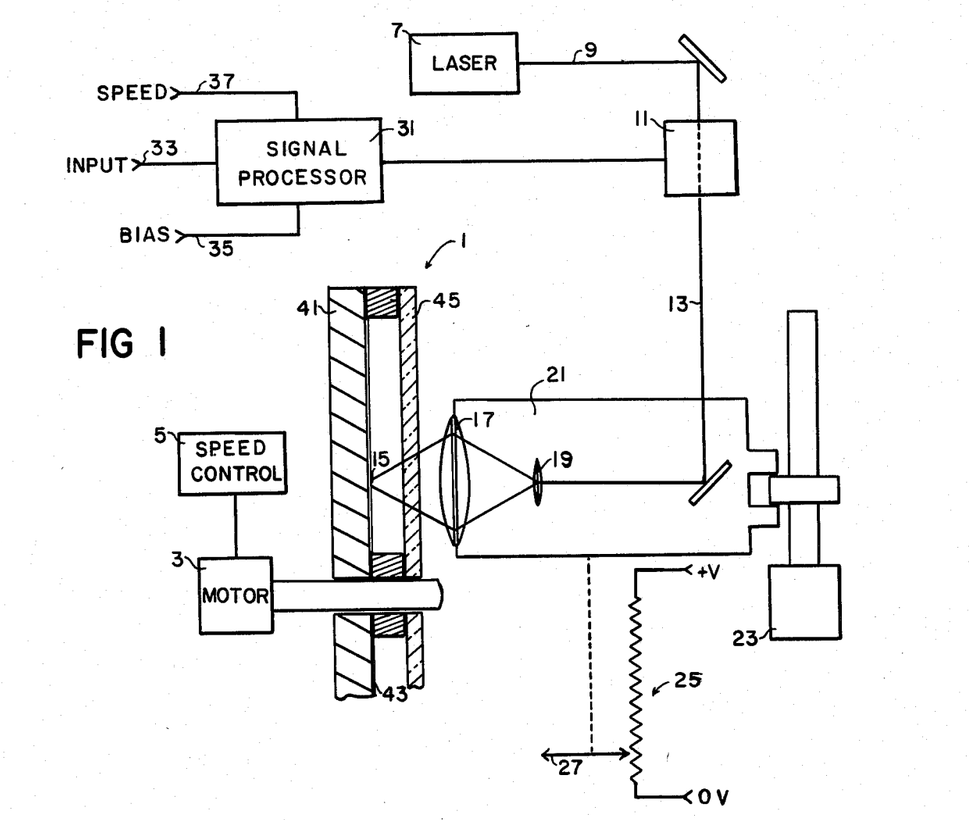
FIG. 1 is a generalized diagram of a recording apparatus in accordance with the present invention.

A generalized diagram of the recording apparatus of the present invention is shown in FIG. 1. The figure includes only those features of the apparatus which are pertinent to the novelty of the present invention. For a description of a complete optical recording apparatus, the reader is referred to the above-mentioned U.S. Pat. No. 4,225,873, which is hereby incorporated by reference.

The recording apparatus of FIG. 1 is designed for recording information on a rotating disc-shaped medium 1. The disc is rotated by a spindle motor 3 which is controlled by a speed controller 5. Naturally, the medium could be in the form of a drum, a card, or a linear tape with the necessary modifications of the media moving systems being obvious to an artisan.

A laser or similar high intensity light source forms a writing beam 9 of a particular wavelength of light. The writing beam passes through an optical modulator 11 which varies the intensity of the writing beam in accordance with a drive signal. By way of example, the modulator 11 may be an accousto-optical modulator.

The beam 13 exiting the modulator will have an amplitude of modulation proportional to the amplitude of the drive signal and will have an average intensity controlled by the DC offset of the drive signal and the intensity of the unmodulated beam 9.

The modulated beam is directed to the recording medium and is focussed to a spot 15 by appropriate optics. These optics preferably include an objective lens 17 and a beam expanding lens 19 which spreads the beam from the modulator to fill the aperture of the objective lens 17. In the disclosed embodiment, the lenses 17 and 19 are mounted on a carriage 21 to allow radial movement of the spot 15 relative to the disc 1. Naturally, various other arrangements are possible for moving the spot 15 relative to the medium, including the movement of the spindle motor. In the disclosed embodiment, the carriage is moved by a translational drive system 23. A position indicating device 25 may be coupled to the carriage to produce a signal indicative of the radial position of the spot 15 on the medium 1. The measuring device 25 is shown as a potentiometer, but can clearly take other forms, such as an interferometer. The position indicating device is necessary only if the speed of the medium relative to the spot 15 is dependent upon the position of the spot 15 relative to the medium. For the embodiment shown, the relative speed will be proportional to the angular velocity of the disc and the voltage of the output 27 of the potentiometer 25.

The drive signal for the optical modulator 11 is formed by a signal processing system 31. The processing system includes an input 33 for receiving the information to be recorded and may also include an input 35 for receiving a drive signal bias control for adjusting the average intensity of the modulated beam 13. If the speed of the information medium relative to the focussed spot 15 is not constant, the signal processing system may include an input 37 for receiving a signal indicative of the instantaneous relative speed. As mentioned above, this speed information may be derived from position indicater 25. If the speed of the medium varies under control of the speed controller 5, the speed information can be derived directly from the speed controller or from a tachometer or the like coupled to the motor 3.

The recording medium 1 may include a substrate 41 and a light responsive recording layer 43 coated on the substrate. A transparent member 45 may be interposed between the recording layer 43 and the objective lens 17 to prevent dust and other contamination from settling on the recording layer. Alternatively, the recording layer may be formed on the inner surface of the member 45.

If a transparent member 45 is interposed between the recording layer 43 and the objective lens 17, the optical system must be designed to compensate for the refractive effects of the member on the modulated beam 13. Any such design of the optical system will be based on an expected thickness and index of refraction of the member 45, and any variation of these parameters in the member from the expected values will decrease the degree of focus of the spot 15, enlarging the spot and changing the distribution of intensity across the spot. The higher the numerical aperture of the objective lens, the greater the defocussing effect of the spot 15 for a given variation in the optical parameters of the member 45 from the expected values. The maximum numerical aperture usable in a system may therefore be limited by the achievable optical tolerances of the member 45 and the tolerable degree of defocussing of the spot 15. Other factors such as required focal depth for the objective lens and economic considerations may also place a limit on the usable numerical aperture.

For example, while it is preferable to use a 0.65 or higher NA lens for recording a video disc master having spatial frequencies over 1200 cycles/mm, the use of a plastic window member 45 can introduce unacceptable focus aberrations in a lens as low as 0.6 NA. A 0.55 lens is therefore preferred.

Figure 2:
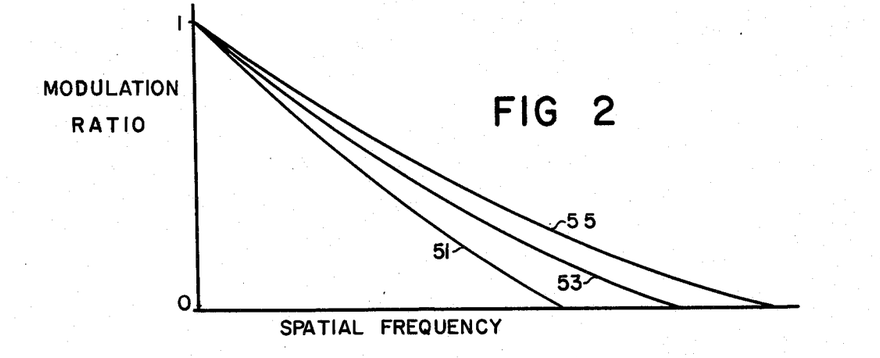
FIG. 2 is a graph of modulation transfer functions for various lenses.

FIG. 2 is a graph showing the modulation transfer function curves for three different lenses of varying numerical aperture. The abscissa of this graph represents the spatial frequency of the information on the medium, and the ordinate of the graph represents the ratio between the amplitude of the modulation of the image with respect to the amplitude of modulation of the object.

For all three of the lenses represented by the curves on the graph, the amplitude of modulation of the image is equal to the amplitude of modulation of the object only when the spatial frequency is equal to zero.

The curve 51 represents a relatively low NA lens compared to the curve 53, and the curve 55 represents a relatively high NA lens compared to the curve 53. While each of the curves is approximately a straight line, they each have a different average slope, the steeper the slope indicating a greater variation in image modulation amplitude for a given change in spatial frequency.

Each of the curves intersects the X axis of the graph at a particular spatial frequency which represents the cut-off frequency above which the image has no modulation. The cut-off frequency is equal to two times the numerical aperture divided by the wavelength of the light.

While the concepts of modulation transfer function and spatial frequency were developed to discuss effects noticed in the field of imaging systems, it has been found that the same modulation transfer function accurrately predicts the variation of exposure level modulation amplitude with spatial frequency for an optical recording system using a modulated writing beam focussed to a diffraction limited spot. Since the modulation transfer function can be readily calculated for any optical system of known numerical aperture and a known wavelength of light, this discovery allows the determination of a gain versus frequency function of a signal processing system for compensating for the spatial frequency effects of a particular lens over the range of spatial frequencies recorded with that lens.

Since no amount of equalization will provide exposure level modulation at spatial frequencies above the cut-off frequency, and since the maximum amount of modulation of the writing beam is limited by the efficiency of the modulator, it is only practical to operate at spatial frequencies up to approximately half of the cut-off frequency.

Figure 3:
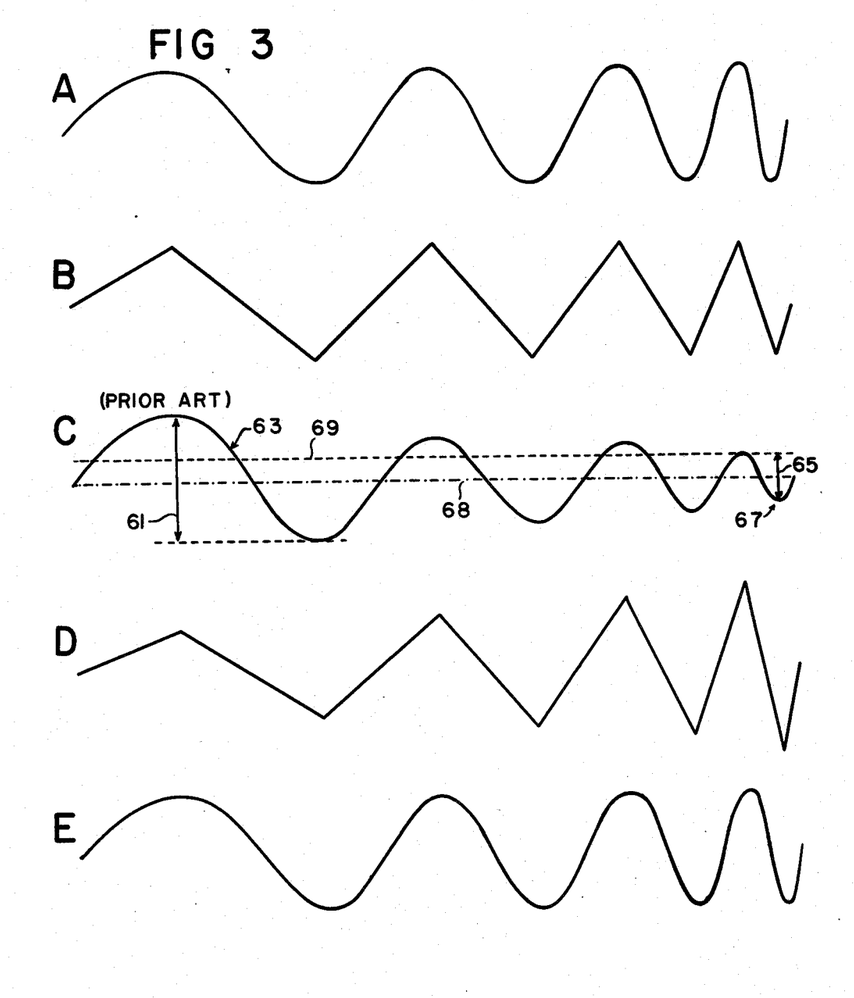
FIG. 3, consisting of A-E, is a series of waveforms demonstrating the effect of the present invention.

FIG. 3 shows a series of waveforms demonstrating the effect of the invention.

Waveform A is a frequency varying sinusoidal information waveform to be optically recorded. This waveform has a constant amplitude and represents information as a frequency variation from a carrier frequency.

Waveform B represents a prior art modulator drive signal for recording waveform A. Since most optical modulators have a sinusoidal transfer function, the drive signal is preferably in the form of a triangle wave. A triangle wave has an amplitude which varies linearly with time, so that the resultant intensity modulation of the writing beam varies sinusoidally with time as a result of the sinusoidal transfer function of the modulator.

Waveform C is a graph of the exposure level of respective points along the medium corresponding to the position of the center of the focussed writing spot during the time that waveform B controls the modulation of the writing beam. This graph shows a decrease in exposure level modulation with increasing frequency of the information signal, corresponding to an increase in spatial frequency along the medium. As described above, the decrease is caused by the finite size of the writing spot, and agrees with the decrease in modulation level predicted by the MTF of the writing optical system. The distance 61 represents the total operating margin over which the amplitude of the exposure level can vary relative to the threshold level of the medium and still record information at the lower spatial frequency of the portion 63 of the waveform. The distance 65 is the corresponding operating margin for the higher frequency portion 67 of the waveform. Naturally, the information written near the extremes of this operating level will be highly distorted. However, the relative size of the useful operating margin is proportional to the distances 61 and 65 at the respective spatial frequencies.

If the amplitude of the modulated beam is perfectly adjusted such that the threshold level of the medium is represented by the line 68, the information will be recorded without distortion. However, if the intensity of the modulated beam drifts slightly relative to the threshold level of the medium, such that the threshold level is represented by the line 69, the low frequency information may be recorded with only negligible distortion, whereas the high frequency information may not be recorded at all.

Waveform D represents the modulator drive signal formed in accordance with the present invention. The amplitude of this signal varies with frequency as the inverse of the modulation transfer function of the recording apparatus optical system. The waveform E indicates the level of exposure on the medium resulting from the modulation controlled by the waveform D. The uniform amplitude of this waveform indicates that the level of exposure is independent of the spatial frequency of the information. This results in a uniform operating margin regardless of spatial frequency of the information.

Figure 4:
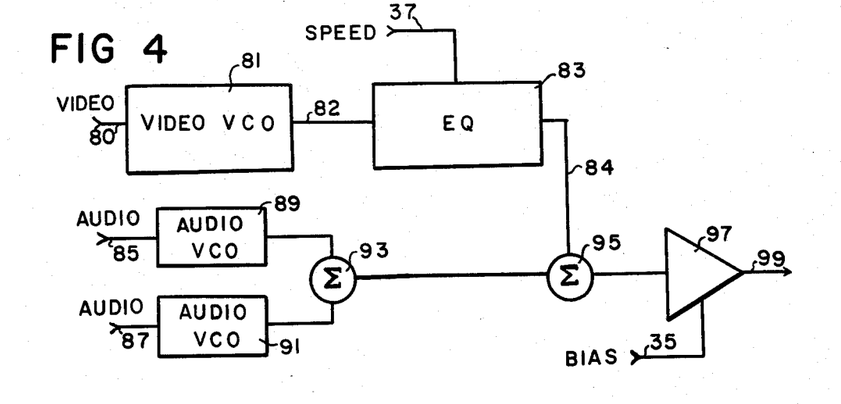
FIG. 4 is a block diagram of the signal processing electronics of the present invention.

FIG. 4 is a block diagram of a signal processing system for achieving the objects of the present invention for the particular case of recording video and audio information on a disc-shaped medium. The system includes a triangle voltage-controlled oscillator 81 for frequency modulating a video signal input on line 80. The output from the triangle voltage-controlled oscillator on line 82 is similar to waveform B of FIG. 3. This signal is directed to a linear phase equalization circuit 83 having a gain which varies with the frequency of the information signal. The gain versus frequency function is preferably determined so that it is the inverse of the modulation transfer function of the optical system of the recording apparatus. The waveform output by the equalizer 83 on the line 84 is similar to the waveform D of FIG. 3.

First and second audio inputs 85 and 87 control respective voltage controlled oscillators 89 and 91 which transform the amplitude varying audio signals into respective FM signals which vary in frequency relative to respective carrier frequencies. The two FM audio signals are summed by a summing network 93 and this resultant sum is summed with the frequency compensated triangle waveform from the equalizer 83 in the summing network 95. The resultant composite signal is fed to amplifier 97 which forms the final modulator drive signal on line 99. In accordance with known technique, the average intensity of the modulated beam may be varied over a limited range by varying the DC bias of the signal on the line 99. This may be done by introducing an offset voltage on the amplifier input 35.

Since the modulation transfer function expresses the amplitude of modulation of the exposure level in terms of the spatial frequency, and since the spatial frequency is related to the information frequency in proportion to the reciprocal of the relative speed between the focussed writing spot and the medium, a change in the speed of the medium relative to the writing spot results in a change in the correspondence between information frequency and spatial frequency, and therefore a change in the position of the modulation transfer function curve corresponding to a given information frequency. To maintain the gain versus frequency curve of the signal processing system as the inverse of the modulation transfer function as the speed of the medium relative to the writing spot changes, it is necessary to alter the slope of the gain versus frequency function in proportion to the speed change. For this reason, a signal indicative of the relative speed between the medium and the writing spot is input to the equalizer 83 over the line 37. The source of this signal was discussed with reference to FIG. 1.

Figure 5:
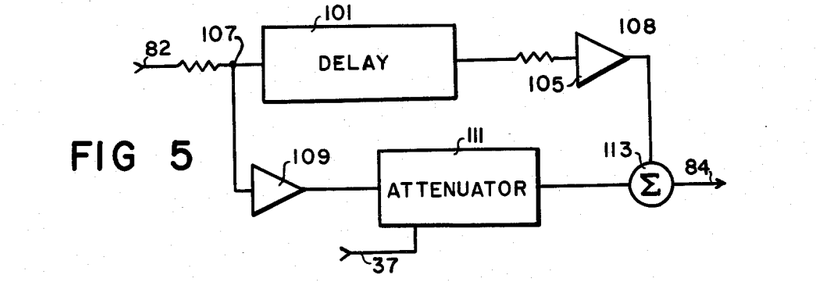
FIG. 5 is a block diagram of a preferred equalization network for use in the present invention.

FIG. 5 is a block diagram of a preferred embodiment of the linear phase equalizer 83 of FIG. 4. The equalizer shown in FIG. 5 is of a type known as a cosine equalizer. Such an equalizer is preferred due to its linear phase characteristics which prevent phase distortion of the information signal. The cosine equalizer is also preferred because it is readily adaptable to allow a change of the slope of the gain versus frequency function of the equalizer as a result of a change in level of a speed indicating signal.

The disclosed cosine equalizer includes a delay line 101 of a fixed delay time. A signal input on line 82 will appear at the output 105 of the delay line substantially undistorted, but delayed by a fixed time period. The delay line output 105 is connected to an amplifier 108 having a relatively high input impedance. Because the output 105 of the delay line is connected only to the amplifier 108, it is essentially unterminated and a portion of the signal exiting the delay line on the output 105 will be reflected due to the impedance mismatch between the delay line and the unterminated output. This reflected portion of the time delayed signal will travel back through the delay line and appear at the point 107 delayed by twice the delay period of the delay line. Accordingly, the undelayed signal and a signal delayed twice the period of the delay line are present at the point 107. The composite signal at the point 107 is amplified by a buffer amplifier 109 and fed to a voltage controlled attenuator 111. The output of the voltage controlled attenuator 111 is summed with the output of the buffer amplifier 108 in the summation network 113, the output of which is the equalized signal on line 84 of FIG. 4.

The voltage controlled attenuator 111 selectively varies the amplitude of the composite signal from amplifier 109 consisting of the undelayed information signal and the information signal delayed by twice the delay period of delay line 101, relative to the information signal delayed by a single delay period. As this ratio of the signals changes, the slope of the gain versus frequency function of the cosine equalizer changes. The ratio of the signals is controlled by the level of the speed indicating signal on input 37 of the voltage controlled attenuator 111.

The voltage controlled attenuator can take the form of a voltage controlled amplifier in series with a fixed attenuator such as a voltage divider, or may be formed by a voltage division network in which one of the elements has a resistance proportional to the control signal.

Figure 6:
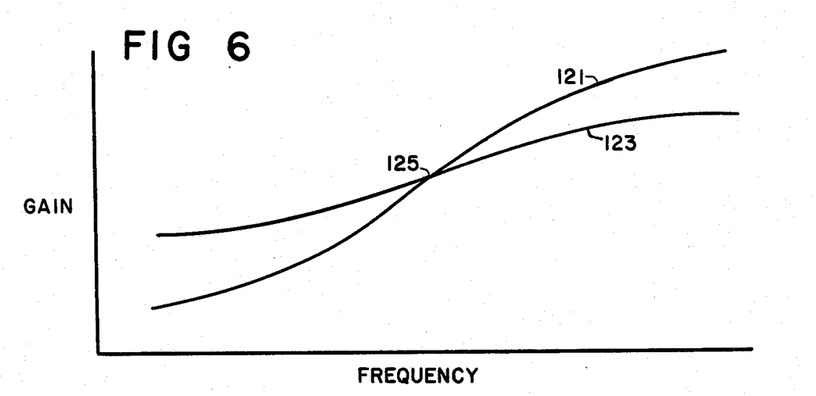
FIG. 6 is a graph of the gain versus frequency functions of the equalizer of FIG. 5 for various speeds of the medium relative to the recording spot.

FIG. 6 is a plot of the gain versus frequency function of the signal processing system of the present invention for two different speeds of the medium relative to the writing spot. The curve 121 represents the values of the function for a low relative speed, requiring a relatively steep slope of the function, and the line 123 represents the values of the function at higher relative speeds calling for a lower slope of the function.

In order to maintain the average amplitude level of the modulated beam constant, it is preferred that the average information frequency corresponds to the point 125 where these two curves intercept. For an information signal in the form of an FM signal, this point should correspond to the carrier frequency.

For an NTSC video disc with a video carrier frequency of approximately 8 MHz, this can be achieved by using a delay line having a period of approximately 33 ns.

Another element of the optical system of a recording apparatus can also affect the modulation amplitude of the writing beam as a function of frequency and thereby affect the exposure level modulation amplitude on the medium. Optical modulators, and especially acousto-optical modulators, act as low pass filters and provide lower modulation amplitude at higher frequencies than at lower frequencies for the same amplitude drive signal. The gain versus frequency function of the signal processing system of the present invention can easily be designed to compensate for all of the frequency dependent elements of the system by making it equal to the inverse of the net response of the recording apparatus over the range of frequencies recorded with the system. The net response of the system will usually be closely approximated by the product of the MTF of the objective lens and the frequency response of the optical modulator.

Since the equalization required to compensate for the optical modulator does not vary with the speed of the medium relative to the focussed spot, this equalization can be performed by a separate equalization stage in series with the speed dependent equalizer 83, or by adding a fixed component to the speed indicating signal on line 37.

From the above description it will be apparent to the artisan that the present invention provides an improved system for the optical recording of information by making the operating margin of the system essentially independent of spatial frequency and thereby facilitating the recording of high frequency information.

Although the invention has been described in detail with reference to its presently preferred embodiment, it will be understood by one of ordinary skill in the art that various modifications can be made without departing from the spirit and scope of the invention. Accordingly, it is not intended that the invention be limited, except as by the appended claims.

What is claimed:

1. A signal processing system for use in an optical recording apparatus including an optical modulator for modulating the intensity of a writing beam of light above and below a threshold level of a moving recording medium in response to a driving signal for recording information on the medium, said apparatus including optical components including an objective lens for focussing the writing beam to a spot of finite size on the medium, said optical components having a known modulation transfer function expressing the ratio between the intensity modulation of the unfocussed writing beam exiting the modulator and the point to point modulation of the level of exposure of the medium by the focussed beam as a function of the spatial frequency of the exposure pattern on the moving recording medium, said spatial frequency being the product of the frequency of the driving signal and the reciprocal of the speed of the medium relative to the focussed beam, said signal processing system comprising:

a substantially linear phase frequency compensation means for varying the gain of the drive signal for controlling the modulator as a function of the frequency of the driving signal, the frequency response of said compensation means being substantially the inverse of said modulation transfer function of the optical components of the apparatus at the relative speed between the medium and the focussed writing beam, whereby the modulation amplitude of the level of exposure of the medium by the focussed beam is substantially independent of the frequency of said drive signal.

2. The signal processing system as claimed in claim 1 for use in a recording apparatus including a modulator having a known frequency response, wherein the frequency response of said compensation means is substantially the inverse of the product of the frequency response of the modulator and the modulation transfer function of the optical components of the apparatus.

3. The signal processing system as claimed in claim 1, wherein said compensation means includes a cosine equalizer.

4. The signal processing system as claimed in claim 1 for use in a recording apparatus wherein the relative speed between the medium and the focussed beam is variable, further comprising:
means for varying the frequency response of said compensation means as a function of the relative speed between the medium and the focussed beam, such that the modulation amplitude of the level of exposure of the medium by the focussed beam is independent of the speed of the medium relative to the beam.

5. The signal processing system as claimed in claim 4, wherein:
said compensation means comprises a cosine equalizer; and
said means for varying the frequency response varies the slope of the gain versus frequency function of said equalizer as a function of the speed relative to the focussed beam.

6. The signal processing system as claimed in claim 5, wherein:
the information to be recorded includes a signal having a frequency varying with time relative to a carrier frequency; and
the gain of said cosine equalizer at said carrier frequency remains substantially constant as the slope of the gain versus frequency function varies.

7. Apparatus for optically recording information on a moving recording medium, comprising:
a laser light source;
an optical modulator for modulating the light from said light source above and below a threshold level of the moving medium in accordance with a driving signal;
optical means including an objective lens for focussing the modulated light to a spot of finite size on the moving medium, said optical components having a known modulation transfer function;
means for moving the medium relative to said spot; and
signal processing means for forming said driving signal from an input information signal, said processing means including a frequency compensation means having a gain which is related to the frequency of the information signal by a response function which is substantially the inverse of said modulation transfer function at the relative speed between the spot and the medium.

8. The apparatus as claimed in claim 7, wherein:
said modulation transfer function expresses the ratio between the intensity modulation of the unfocussed writing beam exiting said modulator and the point to point modulation of the level of exposure of the medium by the focussed spot as a function of the spatial frequency of the exposure pattern on the moving disc;
said spatial frequency is a product of the frequency of said driving signal and the reciprocal of said speed relative; and
the resultant modulation amplitude of the level of exposure of the medium by the focussed spot is substantially independent of the frequency of the information signal.

9. The apparatus as claimed in claim 8, wherein: the speed of said medium relative to said spot varies over a defined range; and
said signal processing means further includes means for varying said response function in proportion to said relative speed such that the modulation amplitude of the level of exposure of the medium by the spot is independent of said relative speed.

10. The apparatus as claimed in claim 9 for recording information on a disc-shaped medium, wherein:
said means for moving rotates the medium at a constant angular velocity; and
said means for varying includes means for sensing the radius of the medium at which the spot is located and for varying said response function in proportion to the reciprocal of the radius.

11. The apparatus as claimed in claim 9, wherein:
said compensation means includes a cosine equalizer; and
said means for varying varies the slope of said response function of said cosine equalizer.

12. The apparatus as claimed in claim 11, wherein:
said cosine equalizer includes delay means for delaying said input information signal, said delay means having a first output for providing an information signal delayed by a fixed period, said delay means having a second output for providing a sum of the undelayed information signal and an information signal delayed by twice said fixed period;
said cosine equalizer further including means for summing a portion of the signal from said first output with the signal from said second output; and
said means for varying includes voltage controlled attenuator means for varying the ratio between the signal from said first output and the signal from said second output as a function of said relative speed.

13. The apparatus as claimed in claim 11, wherein:
the information to be recorded includes a signal having a frequency varying with time relative to a carrier frequency; and
the gain of said cosine equalizer at said carrier frequency remains substantially constant as the slope of the gain versus frequency function varies.

14. The apparatus as claimed in claim 13, wherein said frequency varying signal is video information; and
further comprising means for summing at least one frequency modulated audio signal to the output of said compensation means for forming said driving signal.

15. Apparatus for optically recording information on a moving recording medium, comprising:
a laser light source;
an optical modulator for modulating the light from said light source above and below a threshold level of the moving medium in accordance with a driving signal, said modulator having a known frequency response;

optical means including an objective lens for focussing the modulated light to a spot of finite size on the moving medium, said optical components having a known modulation transfer function;

means for moving the medium relative to said spot; and signal processing means for forming said driving signal from an input information signal, said processing means including a frequency compensation means having a gain which is related to the frequency of the information signal by a response funnction which is substantially the inverse of the product of the modulator frequency response and said modulation transfer function at the relative speed between the spot and the medium.

16. The apparatus as claimed in claim 15, wherein:

said modulation transfer function expresses the ratio between the intensity modulation of the unfocussed writing beam exiting said modulator and the point to point modulation of the level of exposure of the medium by the focussed spot as a function of the spatial frequency of the exposure pattern on the moving disc;

said spatial frequency is a product of the frequency of said driving signal and the reciprocal of said speed relative; and the resultant modulation amplitude of the level of exposure of the medium by the focussed spot is substantially independent of the frequency of the information signal.

17. The apparatus as claimed in claim 16, wherein:

the speed of said medium relative to said spot varies over a defined range; and said signal processing means further includes means for varying said response function in proportion to said speed relative such that the modulation amplitude of the level of exposure of the medium by the spot is independent of said speed relative.

18. A signal processing method for use in optically recording information on a moving medium by modulating the intensity of a writing beam of light above and below a threshold level of the moving medium in response to a driving signal, focussing the writing beam to a spot of finite size on the medium using optical components having a known modulation transfer function expressing the ratio between the intensity modulation of the unfocussed writing beam exiting the modulator and the point to point modulation of the level of exposure of the medium by the focussed beam as a function of the spatial frequency of the exposure pattern on the moving recording medium, said spatial frequency being the product of the frequency of the driving signal and the reciprocal of the speed of the medium relative to the focussed beam, said signal processing method comprising:

varying the gain of the drive signal for controlling the modulator as a function of the frequency of the driving signal, said gain versus frequency function being substantially the inverse of said modulation transfer function of the optical components of the apparatus at the relative speed between the medium and the focussed writing beam, whereby the modulation amplitude of the level of exposure of the medium by the focussed beam is substantially independent of the frequency of said drive signal.

19. The signal processing method as claimed in claim 18, wherein the relative speed between the medium and the focussed beam is variable, further comprising:

varying said gain versus frequency function as a function of the relative speed between the medium and the focussed beam, such that the modulation amplitude of the level of exposure of the medium by the focussed beam is independent of the speed of the medium relative to the beam.

20. A method for optically recording information on a moving recording medium, comprising the steps of:

modulating the light from a laser light source above and below a threshold level of the moving medium in accordance with a driving signal;

focussing the modulated light to a spot of finite size on the moving medium using optical components including an objective lens having a known modulation transfer function;

moving the medium relative to said spot; and frequency compensating an input information signal to form said driving signal, said step of frequency compensating varying the amplitude of the drive signal relative to the information signal in accordance with a response function of the frequency of the information signal which is substantially the inverse of said modulation transfer function at the relative speed between the spot and the medium.

21. The method as claimed in claim 20, wherein:

said modulation transfer function expresses the ratio between the intensity modulation of the unfocussed writing beam exiting said modulator and the point to point modulation of the level of exposure of the medium by the focussed spot as a function of the spatial frequency of the exposure pattern on the moving disc;

said spatial frequency is a product of the frequency of said driving signal and the reciprocal of said relative speed and the resultant modulation amplitude of the level of exposure of the medium by the focussed spot is substantially independent of the frequency of the information signal.

22. The method as claimed in claim 21, wherein:

said step of moving the medium includes varying the speed of said medium relative to said spot over a defined range; and said step of frequency compensating further includes varying said response function in proportion to said speed of the medium such that the modulation amplitude of the level of exposure of the medium by the spot is independent of said relative speed.

23. The method as claimed in claim 22 for recording information on a disc-shaped medium, wherein:

said step of moving includes rotating the medium at a constant angular velocity; and said step of varying said response function includes means for sensing the radius of the medium at which the spot is located and for varying said response function in proportion to the reciprocal of the radius.

* * * * *